United States Patent
Ono et al.

(10) Patent No.: US 9,747,537 B2
(45) Date of Patent: *Aug. 29, 2017

(54) POWER CONTROLLING DEVICE, IMAGE PROCESSING APPARATUS, COMPUTER READABLE MEDIUM, AND POWER CONTROLLING METHOD

(71) Applicant: FUJI XEROX CO., LTD., Tokyo (JP)

(72) Inventors: Masafumi Ono, Kanagawa (JP); Manabu Hayashi, Kanagawa (JP); Naoya Nobutani, Kanagawa (JP); Kenji Kuroishi, Kanagawa (JP); Yuji Murata, Kanagawa (JP); Masahiko Mizumura, Kanagawa (JP); Yasuhiro Endo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,792

(22) Filed: Jun. 27, 2016

(65) Prior Publication Data
US 2016/0307080 A1    Oct. 20, 2016

Related U.S. Application Data

(63) Continuation of application No. 14/107,598, filed on Dec. 16, 2013, now Pat. No. 9,406,006.

(30) Foreign Application Priority Data

Jun. 28, 2013 (JP) .................................. 2013-136697

(51) Int. Cl.
*G06K 15/00* (2006.01)
*G06F 21/30* (2013.01)
(Continued)

(52) U.S. Cl.
CPC .......... *G06K 15/4055* (2013.01); *B41J 29/00* (2013.01); *G03G 15/50* (2013.01);
(Continued)

(58) Field of Classification Search
CPC ........ G06F 9/4443; G06F 9/4445; G06F 3/12; G06F 3/048; G06F 3/04886;
(Continued)

(56) References Cited

U.S. PATENT DOCUMENTS 8,560,004 B1 *  10/2013  Tsvetkov ................ H04M 1/67
                                                                310/328
9,065,955 B2 *   6/2015  Baba .................. H04N 1/00323
(Continued)

FOREIGN PATENT DOCUMENTS

JP    H05-45471 A      2/1993
JP    2007-245414 A    9/2007
(Continued)

OTHER PUBLICATIONS

Aug. 2, 2016 Office Action issued in Japanese Patent Application No. 2013-136697.

*Primary Examiner* — Chad Dickerson
(74) *Attorney, Agent, or Firm* — Oliff PLC

(57) ABSTRACT

A power controlling device includes a detecting unit that detects a person in a detection area, a first imaging unit that takes an image of the person in a detecting range in an operating state, a second imaging unit that takes an image of a face of the person for use in user authentication in an operating state, and a power controller that supplies power to and brings the first imaging unit into the operating state if the person is detected, supplies power to and brings a processing unit that performs a process into an operating state if the approach of the person is determined on the basis of the taken image of the person, and supplies power to an (Continued)

brings the second imaging unit into the operating state during a period from the detection of the person to the shift of the processing unit to the operating state.

14 Claims, 14 Drawing Sheets

(51) Int. Cl.
*B41J 29/00* (2006.01)
*G03G 15/00* (2006.01)
*G06F 21/00* (2013.01)
*G06F 21/60* (2013.01)
*G06F 21/81* (2013.01)
*G06F 1/32* (2006.01)
*G06F 3/12* (2006.01)

(52) U.S. Cl.
CPC ......... *G03G 15/5004* (2013.01); *G06F 1/325* (2013.01); *G06F 1/3231* (2013.01); *G06F 21/00* (2013.01); *G06F 21/608* (2013.01); *G06F 21/81* (2013.01); *G06K 15/4095* (2013.01); *G06F 2221/2111* (2013.01); *Y02B 60/1289* (2013.01)

(58) Field of Classification Search
CPC .... G06F 3/0481; G06F 3/1454; G06F 3/1258; G06F 3/1292; G06F 3/1205; G06F 3/1204; G06F 3/1253; G06F 1/3231; G06F 1/325; G06F 3/1222; G06F 3/1238; G06F 3/1273; G06F 3/1279; G06F 21/00; G06F 21/608; G06F 21/81; G06F 21/32; G03G 15/5075; G03G 2215/00109; G03G 15/50; G03G 15/5004; H04N 1/00973; H04N 2201/3278; H04N 2201/3212; H04N 1/00482; H04N 1/00912; H04N 1/00408; H04N 1/00307; H04N 2201/0094; H04N 2201/001; H04N 1/00474; H04N 1/32106; H04N 1/00225; H04N 1/00323; H04N 1/00336; H04N 1/00891; H04N 1/00896; H04N 1/00904; H04N 1/00888; H04M 1/72533; G06K 15/4055; G06K 15/4095; G06K 15/406; G06K 9/00221; G06K 9/00225; G06K 9/00295; G06K 9/00; G06K 9/00362; B22F 3/18; B22F 3/22; B22F 5/006; B41J 29/00; C22C 33/0285; Y02B 60/1289
USPC .......... 358/1.11–1.18, 1.1; 348/207.1; 710/8, 710/14–21; 715/740–744, 746, 751, 753, 715/761, 778, 864, 866; 713/300, 320, 713/323, 324, 330, 340, 186; 726/2–4, 726/16, 17, 21, 26–33; 382/115, 118
See application file for complete search history.

(56) References Cited

U.S. PATENT DOCUMENTS

| | | |
|---|---|---|
| 2009/0148006 A1 | 6/2009 | Hayasaki |
| 2011/0109937 A1* | 5/2011 | Fujiki ................ H04N 1/00885 358/1.15 |
| 2012/0092502 A1 | 4/2012 | Knasel et al. |
| 2012/0204046 A1* | 8/2012 | Baba .................... G06F 1/3231 713/323 |
| 2013/0010335 A1* | 1/2013 | Baba .................. G03G 15/5004 358/3.01 |
| 2014/0104631 A1 | 4/2014 | Baba |
| 2014/0104636 A1 | 4/2014 | Baba |
| 2015/0103365 A1* | 4/2015 | Baba .................. H04N 1/00323 358/1.13 |

FOREIGN PATENT DOCUMENTS

| | | |
|---|---|---|
| JP | 2012-142778 A | 7/2012 |
| JP | 2012-256234 A | 12/2012 |
| JP | 2013-021405 A | 1/2013 |

* cited by examiner

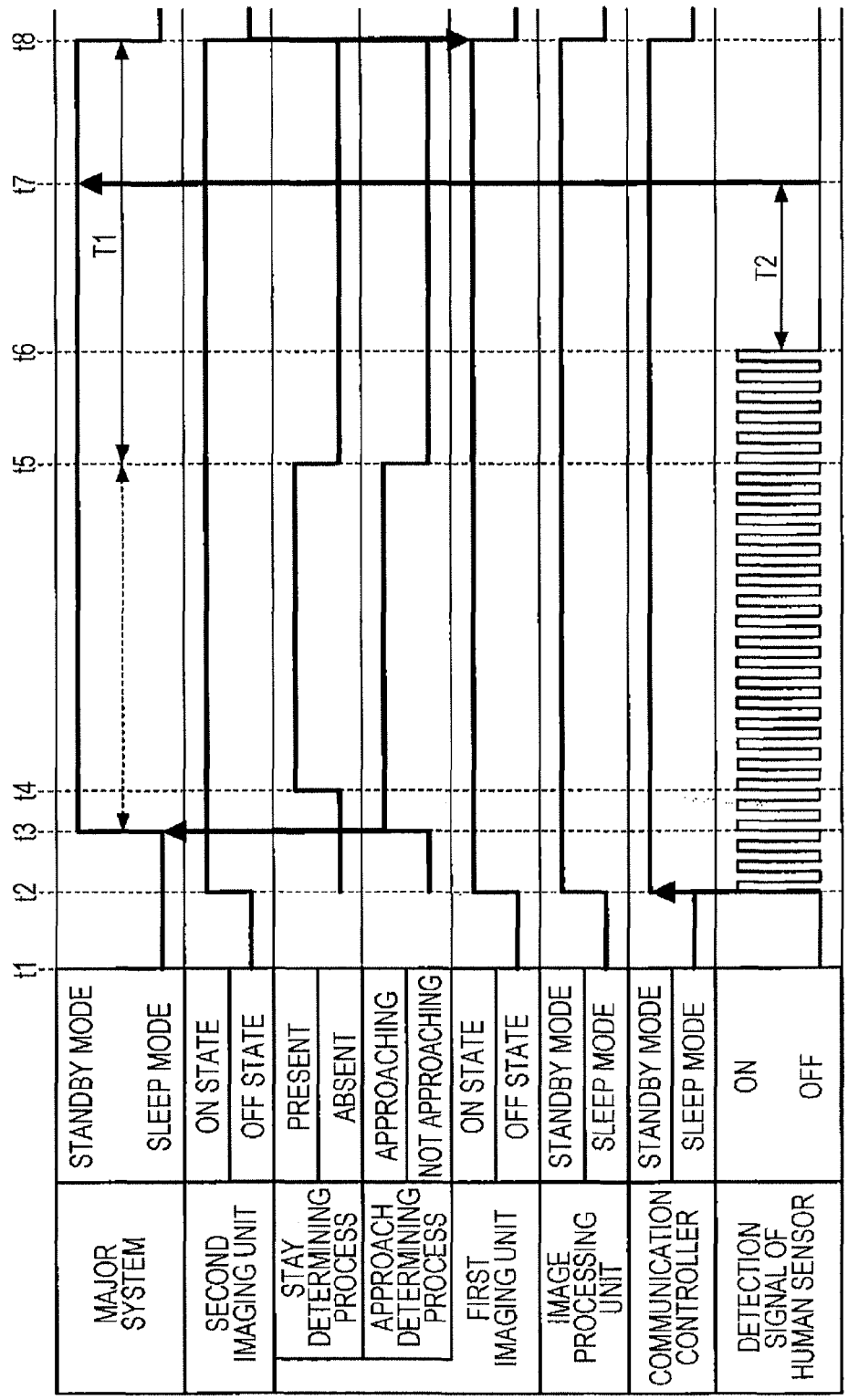

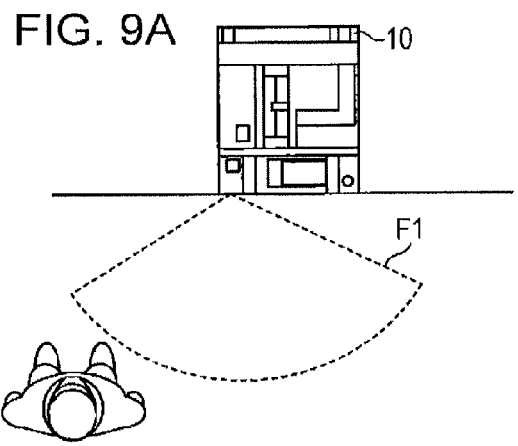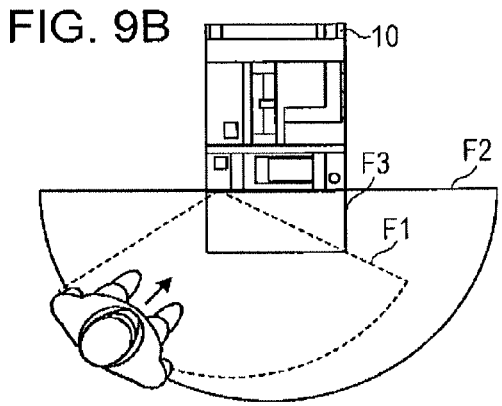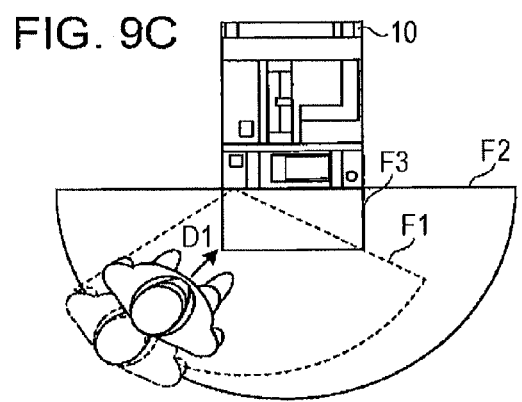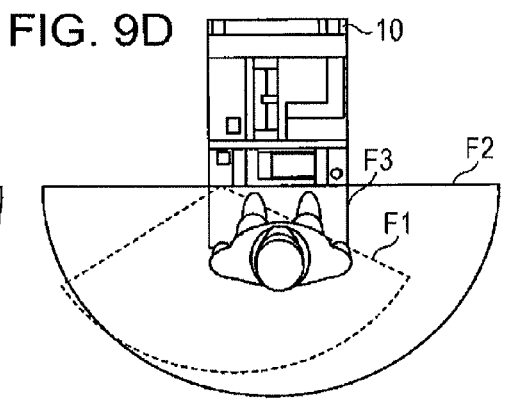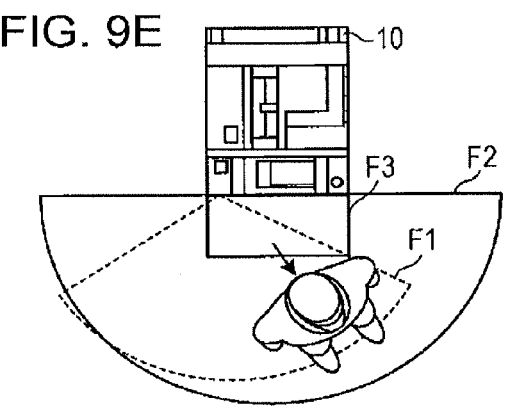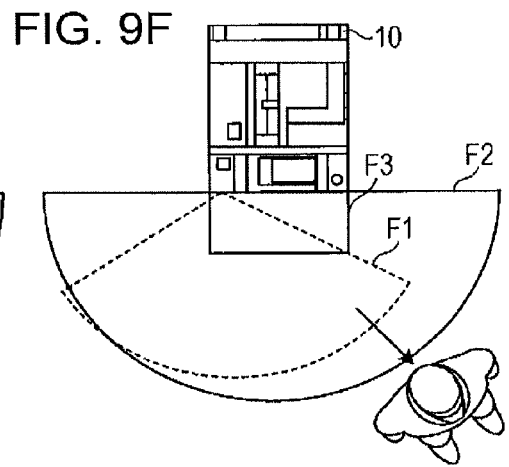

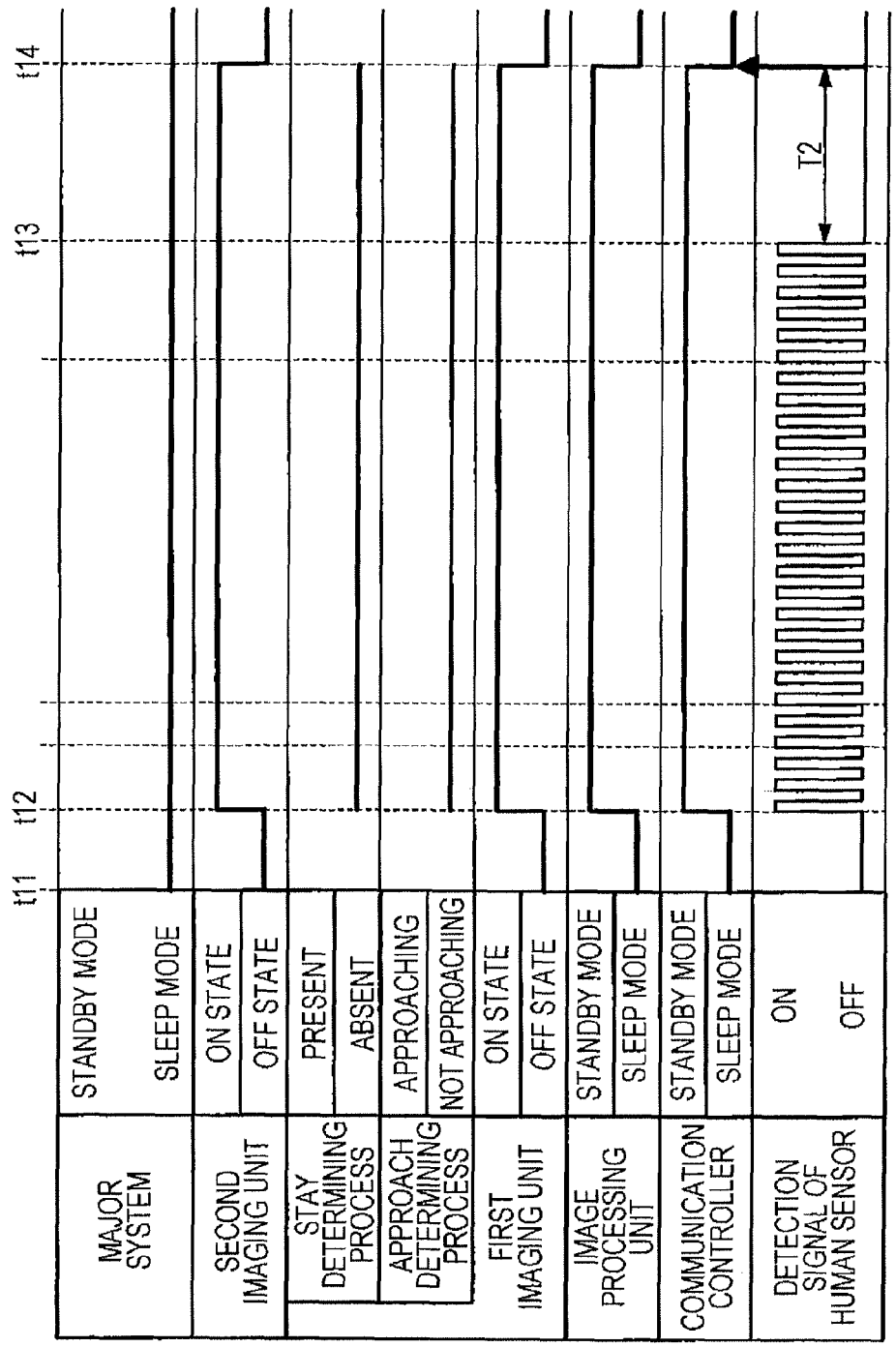

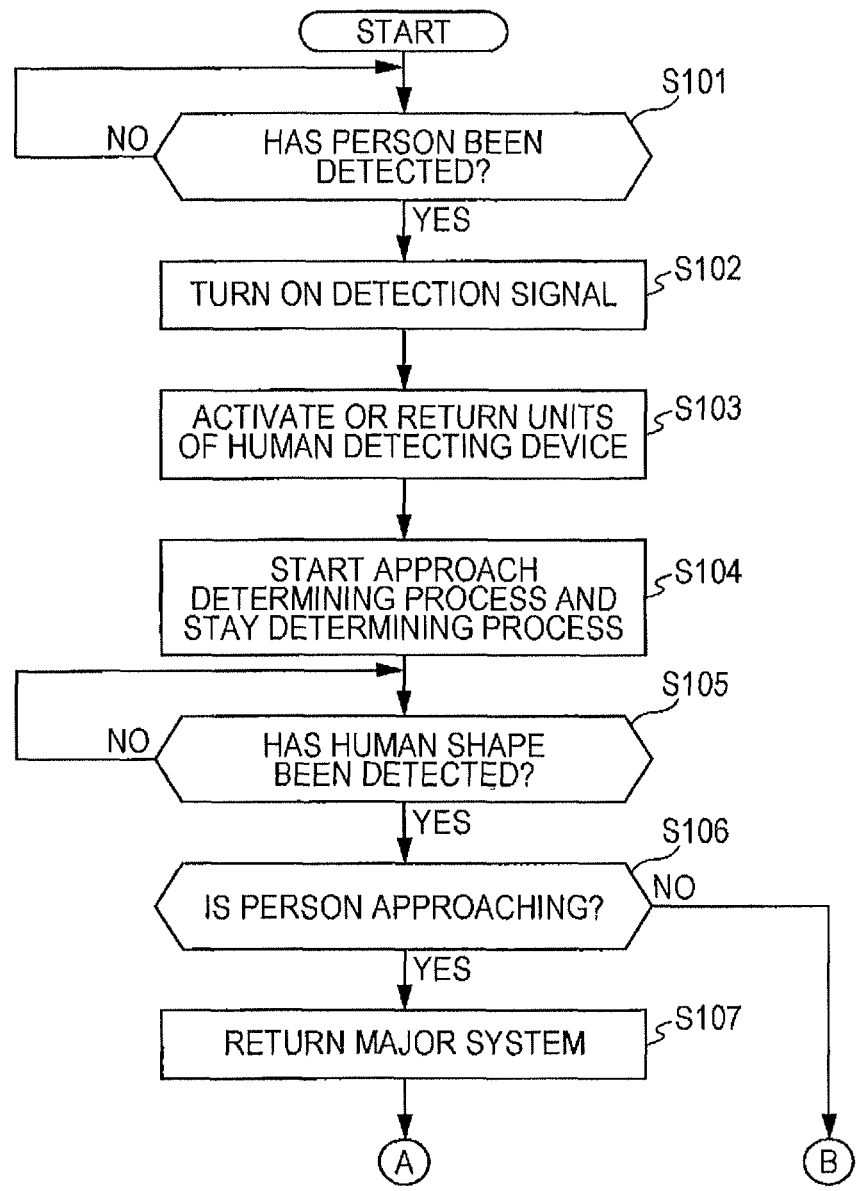

POWER CONTROLLING DEVICE, IMAGE PROCESSING APPARATUS, COMPUTER READABLE MEDIUM, AND POWER CONTROLLING METHOD

CROSS-REFERENCE TO RELATED APPLICATIONS

This application is a continuation of U.S. patent application Ser. No. 14/107,598 filed Dec. 16, 2013 and claims priority under 35 USC 119 from Japanese Patent Application No. 201.3-136697 filed Jun. 28, 2013. The disclosure of the prior applications is hereby incorporated by reference herein in its entirety.

BACKGROUND

Technical Field

The present invention relates to a power controlling device, an image processing apparatus, a computer readable medium, and a power controlling method.

SUMMARY

According to an aspect of the invention, there is provided a power controlling device including a detecting unit, a first imaging unit, a second imaging unit, and a power controller. The detecting unit detects a person present in a detection area. The first imaging unit takes an image of the person present in a detecting range in an operating state. The second imaging unit takes an image of a face of the person for use in user authentication in an operating state. The power controller supplies the first imaging unit with power necessary for the operation thereof to thereby bring the first imaging unit into the operating state if the person is detected by the detecting unit, supplies a processing unit that performs a process with power necessary for the operation thereof to thereby bring the processing unit into an operating state if the approach of the person is determined on the basis of the image taken by the first imaging unit, and supplies the second imaging unit with power necessary for the operation thereof to thereby bring the second imaging unit into the operating state during a period from the detection of the person by the detecting unit to the shift of the processing unit to the operating state.

BRIEF DESCRIPTION OF THE DRAWINGS

An exemplary embodiment of the present invention will be described in detail based on the following figures, wherein:

FIG. 8 is a timing chart illustrating an example of a first shifting operation;

FIGS. 9A to 9F are diagrams illustrating the positional relationship between the image processing apparatus and a person;

FIG. 10 is a timing chart illustrating another example of the first shifting operation;

FIG. 12 is a flowchart illustrating the first shifting operation;

DETAILED DESCRIPTION

1. Configuration (1) Configuration of Entire System

Figure 1:
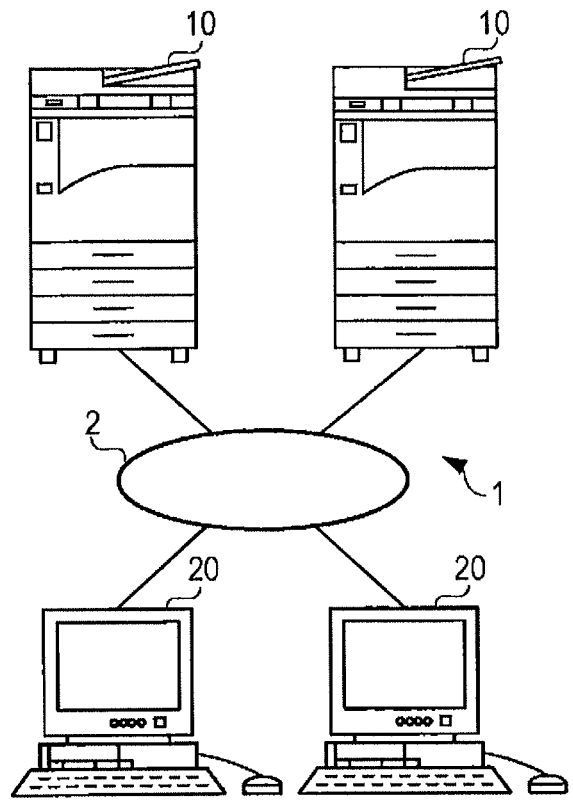
FIG. 1 is a diagram illustrating an overall configuration of an image processing system.

FIG. 1 is a diagram illustrating an overall configuration of an image processing system 1. The image processing system 1 includes image processing apparatuses 10 and client apparatuses 20. The image processing apparatuses 10 and the client apparatuses 20 are connected via a communication line 2, such as a local area network (LAN). Each of the image processing apparatuses 10 has plural functions, such as a print function, a scan function, and a facsimile function. Each of the client apparatuses 20 is operated when a user uses the print function of one of the image processing apparatuses 10. FIG. 1 illustrates two image processing apparatuses 10 and two client apparatuses 20 as an example. The number of the image processing apparatuses 10 and the client apparatuses 20 may be one, three, or a larger number.

(2) Hardware Configuration of Image Processing Apparatus

Figure 2:
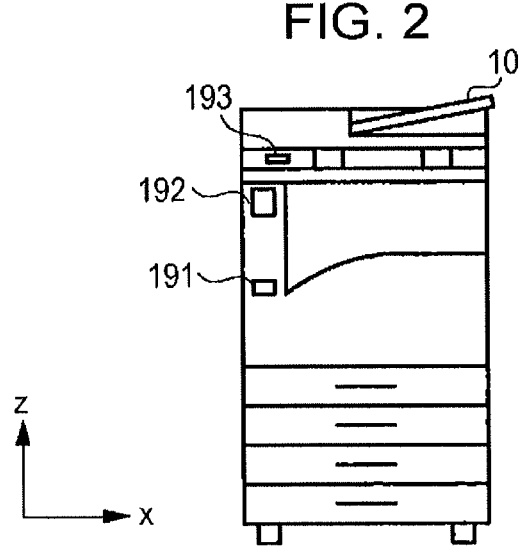
FIG. 2 is a front view of an image processing apparatus.
Figure 3:
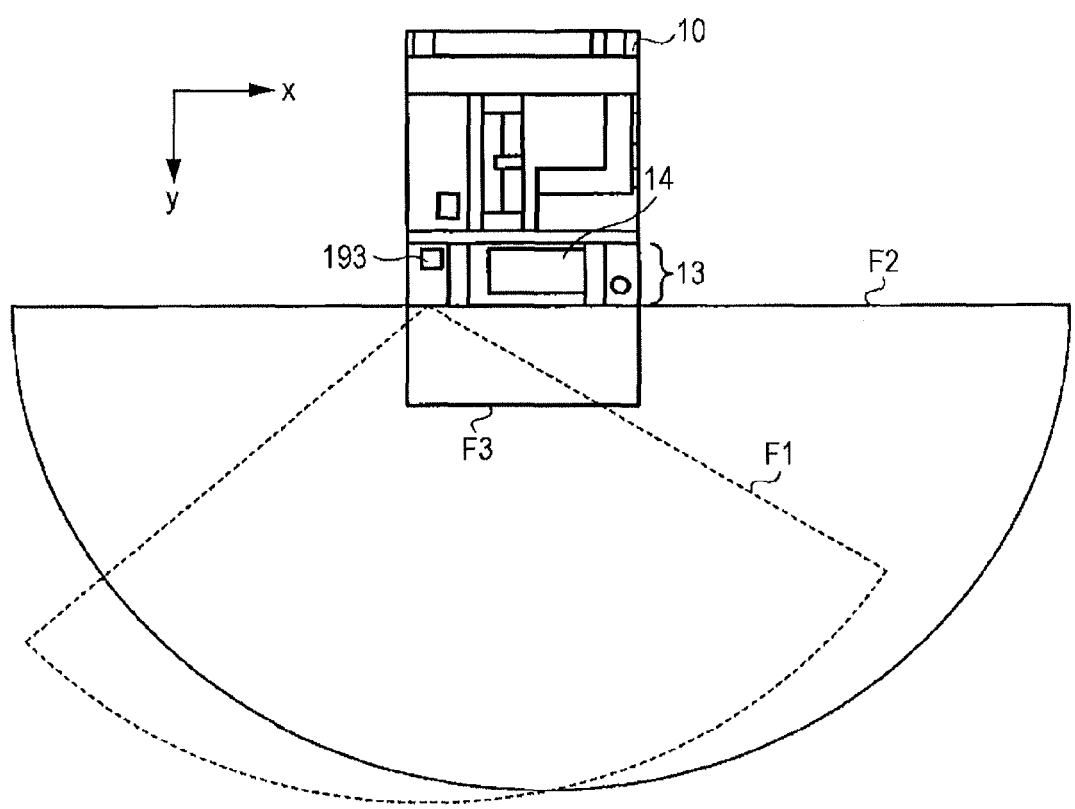
FIG. 3 is a top view of the image processing apparatus.
Figure 4:
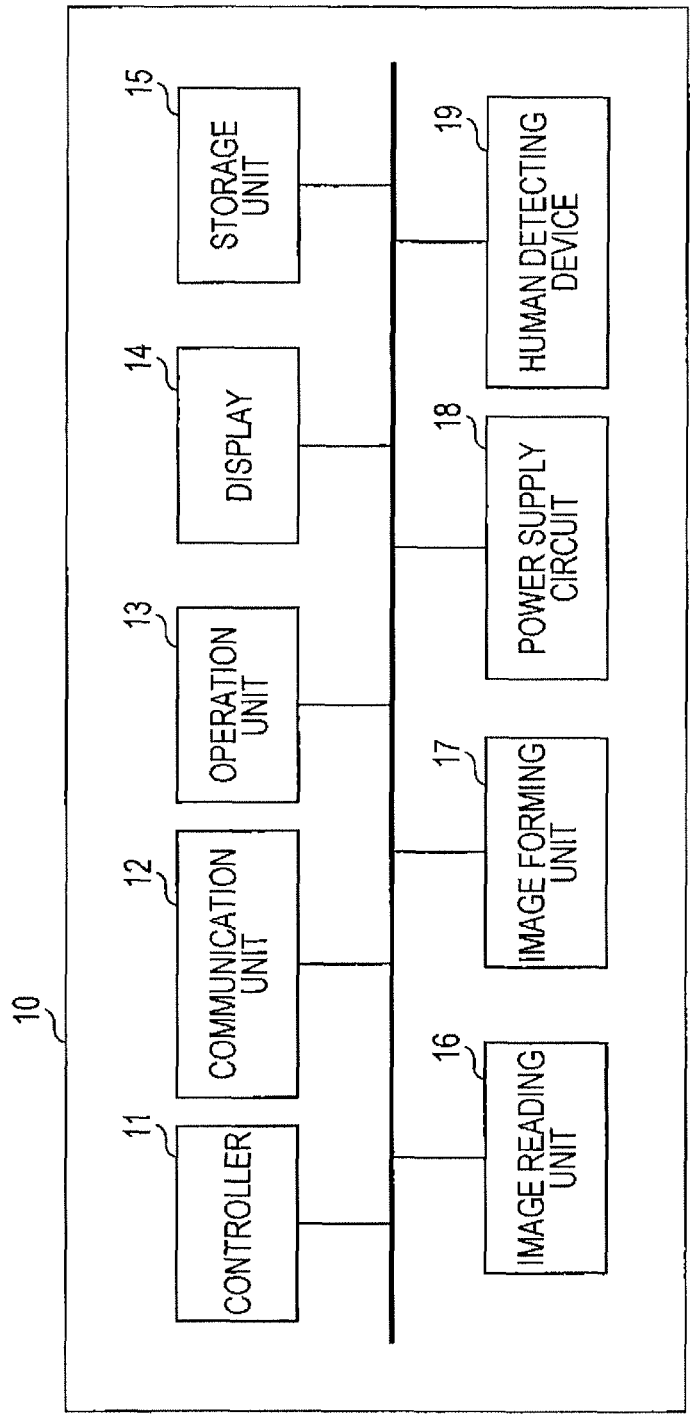
FIG. 4 is a diagram illustrating a hardware configuration of the image processing apparatus.

FIG. 2 is a front view of the image processing apparatus 10. FIG. 3 is a top view of the image processing apparatus 10. FIG. 4 is a diagram illustrating a hardware configuration of the image processing apparatus 10. The image processing apparatus 10 includes a controller 11, a communication unit 12, an operation unit 13, a display 14, a storage unit 15, an image reading unit 16, an image forming unit 17, a power supply circuit 18, and a human detecting device 19.

The controller 11, which includes a central processing unit (CPU) and a memory, for example, controls the respective units of the image processing apparatus 10. The CPU executes programs stored in the memory or the storage unit 15. The memory includes a read only memory (ROM) and a random access memory (RAM), for example. The ROM previously stores programs and data. The RAM temporarily stores programs and data, and is used as a work area when the CPU executes the programs.

The communication unit 12 is an interface for communication connected to the communication line 2. The communication unit 12 communicates with the client apparatuses 20 and another image processing apparatus 10 via the communication line 2. The operation unit 13, which includes a touch panel and various keys, for example, inputs information according to the operation of the user to the controller 11. The display 14, which is a liquid crystal display, for example, displays various information. As illustrated in FIG. 3, the operation unit 13 and the display 14 are provided on the upper surface of a housing of the image processing apparatus 10. The storage unit 15, which is a hard disk, for example, stores various programs and data used by the controller 11.

The image reading unit 16, which is an image scanner, for example, reads the image of a document and generates image data. The image forming unit 17 forms an image according to the image data on a sheet-shaped medium, such as a sheet. The image forming unit 17 may form the image by employing an electrophotographic system or another system. The power supply circuit 18 supplies power to the units of the image processing apparatus 10. The human detecting device 19 has a function of detecting the user of the image processing apparatus 10.

The image processing apparatus 10 performs a scanning process, a copying process, a printing process, and a facsimile transmission process. The scanning process refers to a process of reading an image and generating image data. The scanning process is performed by the image reading unit 16. The copying process refers to a process of reading an image, generating image data, and forming an image on the basis of the image data. The copying process is performed by the image reading unit 16 and the image forming unit 17. The printing process refers to a process of forming an image on the basis of image data received from the client apparatus 20. The printing process is performed by the communication unit 12 and the image forming unit 17. The facsimile transmission process refers to a process of reading an image, generating image data, and transmitting the generated image data to another image processing apparatus 10 via the communication unit 12. The facsimile transmission process is performed by the image reading unit 16 and the communication unit 12.

(3) Hardware Configuration of Human Detecting Device

Figure 5:
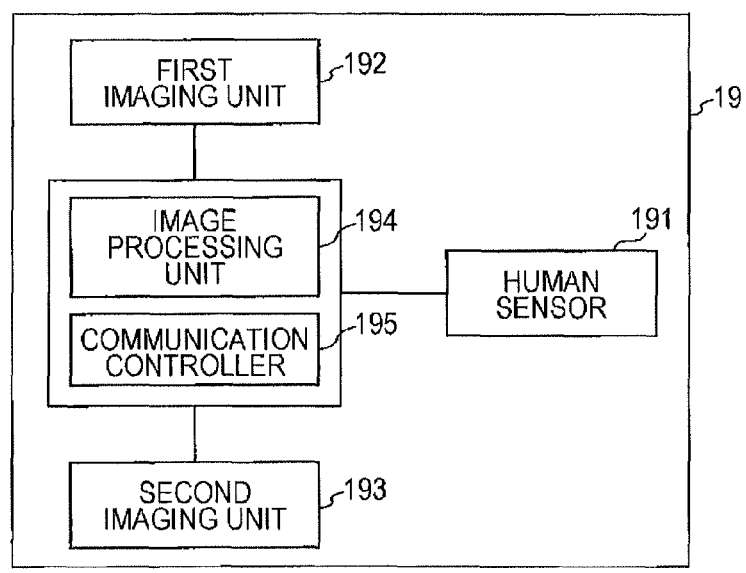
FIG. 5 is a diagram illustrating a hardware configuration of a human detecting device.

FIG. 5 is a diagram illustrating a hardware configuration of the human detecting device 19. The human detecting device 19 includes a human sensor 191 (an example of a detecting unit), a first imaging unit 192, a second imaging unit 193, an image processing unit 194, and a communication controller 195.

The human sensor 191, which is a pyroelectric infrared sensor, for example, is provided on the front surface of the housing of the image processing apparatus 10, as illustrated in FIG. 2. The human sensor 191 detects a person present in a detection area F1 illustrated in FIG. 3, and outputs a detection signal. The detection area F1 is formed in front of the image processing apparatus 10. For example, the detection area F1 is set to a fan-shaped area centering on the human sensor 191 and having, for example, an angle ranging from 90 degrees to 135 degrees and a radius of 1500 mm.

The first imaging unit 192, which is a camera having a wide-angle lens, for example, is provided on the front surface of the housing of the image processing apparatus 10, as illustrated in FIG. 2. The first imaging unit 192 takes the image of a detecting range F2 illustrated in FIG. 3. The detecting range F2 is formed in front of the image processing apparatus 10. For example, the detecting range F2 is set to a semicircular area centering on the first imaging unit 192 and having a radius of 1000 mm, for example.

An operation area F3 (an example of a predetermined area) illustrated in FIG. 3 corresponds to an area in which the user stays when operating the image processing apparatus 10. The operation area F3 is formed in front of the image processing apparatus 10 to be adjacent thereto. For example, the operation area F3 is set to a rectangular area having a length in the x-axis direction corresponding to the length in the x-axis direction of the image processing apparatus 10 and a length in the y-axis direction of 300 mm, for example.

The second imaging unit 193, which is a camera, for example, is provided on the upper surface of the housing of the image processing apparatus 10 to be adjacent to the operation unit 13 and the display 14, as illustrated in FIG. 3. The second imaging unit 193 takes the image of the face of a person using the image processing apparatus 10. The image is used for user authentication.

The image processing unit 194 performs various processes by analyzing the image taken by the first imaging unit 192 and the image taken by the second imaging unit 193. The image processing unit 194 may be formed by a CPU and a memory, or may be formed by an application specific integrated circuit (ASIC). The communication controller 195 controls the communication between the human detecting device 19 and the controller 11.

(4) Functional Configuration of Image Processing Apparatus

Figure 6:
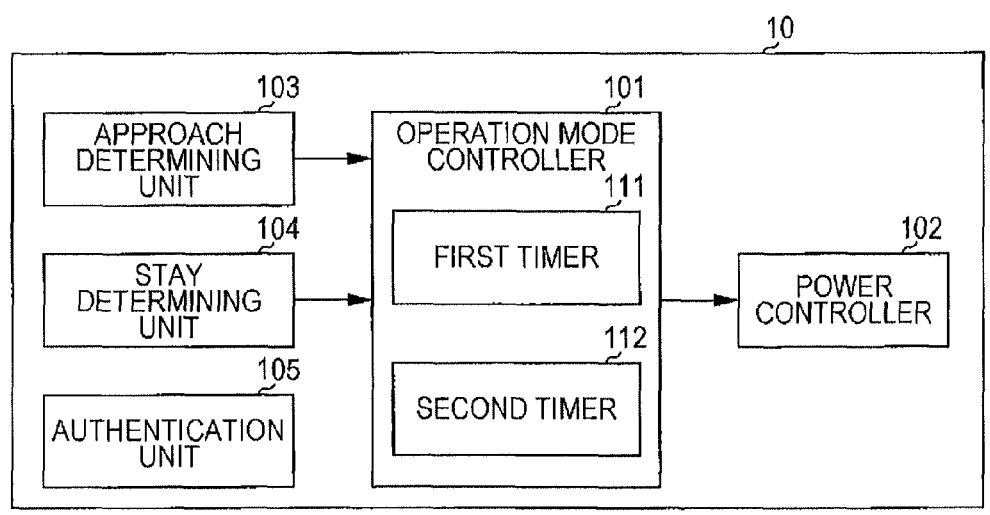
FIG. 6 is a diagram illustrating a functional configuration of the image processing apparatus.

FIG. 6 is a diagram illustrating a functional configuration of the image processing apparatus 10. The image processing apparatus 10 functions as an operation mode controller 101, a power controller 102, an approach determining unit 103, a stay determining unit 104 (an example of a determining unit), and an authentication unit 105. In the present exemplary embodiment, a power controlling device is formed by the human detecting device 19 and the above-described functions. The operation mode controller 101 and the power controller 102 are realized by the controller 11. The approach determining unit 103 and the stay determining unit 104 are realized by the image processing unit 194. The authentication unit 105 is realized by the cooperation of the image processing unit 194 and the controller 11.

The operation mode controller 101 controls the operation mode of each of the units of the image processing apparatus 10. The operation mode controller 101 separately controls the operation mode of a major system (an example of a processing unit) of the image processing apparatus 10, the operation mode of the first imaging unit 192 and the second imaging unit 193, and the operation mode of the image processing unit 194 and the communication controller 195. The major system refers to configurations of the image processing apparatus 10 excluding the human detecting device 19.

The operation mode of the major system includes a standby mode and a sleep mode. In the standby mode, the major system is supplied with power necessary for the operation thereof to be placed in an operating state. The operating state refers to the state in which the operation is executable. If the operation mode shifts to the standby mode, the image processing apparatus 10 performs the scanning process, the copying process, the printing process, or the facsimile transmission process in accordance with the operation of the user. Meanwhile, in the sleep mode, the supply of power to at least a part of the major system is stopped, and at least the part of the major system is placed in a non-operating state. The non-operating state refers to the state in which the operation is inexecutable. In the non-operating state, however, not all operations are required to be inexecutable, and some operations may be executed. In the sleep mode, the supply of power to a part of the controller 11, the display 14, the image reading unit 16, and the image forming unit 17, for example, is stopped. If the operation mode shifts to the sleep mode, the power consumption of the major system is reduced as compared with the standby mode.

The operation mode of the first imaging unit 192 and the second imaging unit 193 includes an ON state and an OFF state. In the ON state, power is supplied to the first imaging unit 192 and the second imaging unit 193 to turn on respective power supplies of the first imaging unit 192 and the second imaging unit 193 (an example of the operating state). Meanwhile, in the OFF state, the supply of power to the first imaging unit 192 and the second imaging unit 193 is stopped to turn off the power supplies of the first imaging unit 192 and the second imaging unit 193 (an example of the non-operating state). In the OFF state, the first imaging unit 192 and the second imaging unit 193 barely consume power.

The operation mode of the image processing unit 194 and the communication controller 195 includes a standby mode and a sleep mode. In the standby mode, the image processing unit 194 and the communication controller 195 are supplied with power necessary for the operation thereof to be placed in the operating state. Meanwhile, in the sleep mode, the supply of power to at least parts of the image processing unit 194 and the communication controller 195 is stopped, and at least the parts of the image processing unit 194 and the communication controller 195 are placed in the non-operating state. If the operation mode shifts to the sleep mode, the power consumption of the image processing unit 194 and the communication controller 195 is reduced as compared with the standby mode.

Further, the operation mode controller 101 includes a first timer 111 and a second timer 112. The first timer 111 is used when shifting the major system to the sleep mode. The second timer 112 is used when bringing the first imaging unit 192 and the second imaging unit 193 into the OFF state and shifting the image processing unit 194 and the communication controller 195 to the sleep mode under a certain condition.

Under the control of the operation mode controller 101, the power controller 102 controls the supply of power to the units of the image processing apparatus 10 from the power supply circuit 18. The power controller 102, however, constantly supplies power to the human sensor 191. Accordingly, the human sensor 191 is constantly in the operating state irrespective of the operation mode of the major system.

Figure 7A:
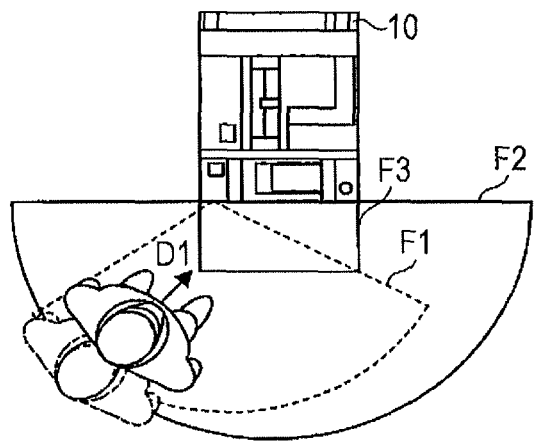
FIGS. 7A and 7B are diagrams illustrating an approach determining process.
Figure 7B:
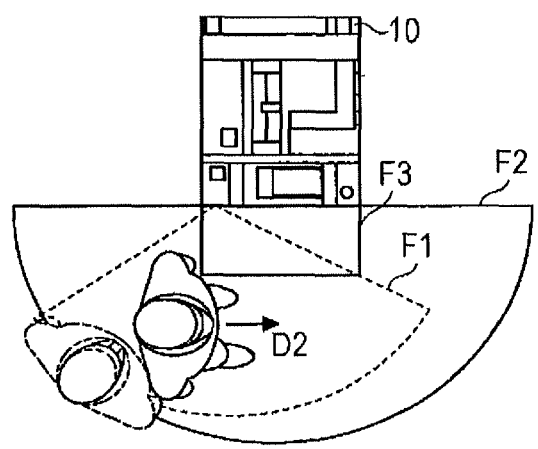

The approach determining unit 103 performs an approach determining process of determining whether or not a person in the detecting range F2 is approaching the image processing apparatus 10 on the basis of the image taken by the first imaging unit 192. FIGS. 7A and 7B are diagrams illustrating the approach determining process. The approach determining process is performed in accordance with the following procedure. Since the first imaging unit 192 takes the image by using the wide-angle lens, the taken image is distorted. Therefore, the image taken by the first imaging unit 192 is first converted into a distortion-corrected planar image by polar coordinate conversion. Then, a human shape is detected from the planar image, and the direction of the detected human body is determined.

If a direction D1 of the detected human body corresponds to a direction approaching the image processing apparatus 10, as illustrated in FIG. 7A, it is indicated that the person in the detecting range F2 is moving toward the image processing apparatus 10. In this case, therefore, it is determined that the person in the detecting range F2 is approaching the image processing apparatus 10. Meanwhile, if a direction D2 of the detected human body is other than the direction approaching the image processing apparatus 10, as illustrated in FIG. 7B, it is indicated that the person in the detecting range F2 is not moving toward the image processing apparatus 10 but is simply passing across the detecting range F2. In this case, therefore, it is determined that the person in the detecting range F2 is not approaching the image processing apparatus 10.

The stay determining unit 104 performs a stay determining process of determining whether or not there is a person in the operation area F3 on the basis of the image taken by the first imaging unit 192. The stay determining process is performed in accordance with the following procedure. Similarly as in the above-described approach determining process, the image taken by the first imaging unit 192 is first converted into a distortion-corrected planer image by polar coordinate conversion. Subsequently, a human shape is detected from the planar image, and the distance between the first imaging unit 192 and the person is calculated on the basis of the size of the detected human shape. Then, whether or not there is a person in the operation area F3 is determined on the basis of the calculated distance. The position coordinates of the first imaging unit 192 and the position coordinates of the operation area F3 on the x-y plane illustrated in FIG. 3 are previously determined.

For example, if the position separated from the first imaging unit 192 by the calculated distance is outside the operation area F3, it is determined that there is no person in the operation area F3. Meanwhile, if the position separated from the first imaging unit 192 by the calculated distance is inside the operation area F3, it is determined that there is a person in the operation area F3. After it is determined that there is a person in the operation area F3, the moving distance of the person may be calculated by extracting the difference between the image taken last time and the image taken this time, and whether or not the person is staying in the operation area F3 may be determined on the basis of the calculated moving distance.

The authentication unit 105 performs a face authentication process of authenticating the user on the basis of the image taken by the second imaging unit 193. The face authentication process is performed in accordance with the following procedure. A face area is first extracted from the image taken by the second imaging unit 193. Then, the features of the extracted face area are checked against the features of a previously registered face image of a valid user, to thereby determine whether or not the face image taken by the second imaging unit 193 matches the face image of the valid user. If the taken face image is determined as the face image of the valid user, the user authentication succeeds. Meanwhile, if the taken face image is not determined as the face image of the valid user, the user authentication fails.

2. Operation

If the user approaches the image processing apparatus 10 or a print request is received from the client apparatus 20 via the communication unit 12 when the major system has shifted to the sleep mode, the image processing apparatus 10 returns to the standby mode. Hereinafter, an operation mode shifting operation performed when the user approaches the image processing apparatus 10 will be referred to as the "first shifting operation," and an operation mode shifting operation performed when a print request is received from the client apparatus 20 via the communication unit 12 will be referred to as the "second shifting operation." The respective shifting operations will be described below.

(1) First Shifting Operation

FIG. 8 is a timing chart illustrating an example of the first shifting operation. FIGS. 9A to 9F are diagrams illustrating the positional relationship between the image processing apparatus 10 and a person. With reference to FIG. 8 and FIGS. 9A to 9F, a description will now be given of an example of the operation performed when the user approaches the image processing apparatus 10 to use the image processing apparatus 10 in a state in which the operation mode of the major system of the image processing apparatus 10, the image processing unit 194, and the communication controller 195 has shifted to the sleep mode and the first imaging unit 192 and the second imaging unit 193 are in the OFF state.

At a time t1, there is no person in the detection area F1, as illustrated in FIG. 9A. Therefore, the human sensor 191 does not detect a person, and the detection signal thereof is off.

At a time t2, a person moves into the detection area F1, as illustrated in FIG. 9B. Then, the human sensor 191 detects the person, and the detection signal turns on. More strictly, the human sensor 191 detects the motion of the person. During the presence of the person in the detection area F1, therefore, the detection signal of the human sensor 191 turns on every time the person moves. Upon turn-on of the detection signal of the human sensor 191, the first imaging unit 192 and the second imaging unit 193 are activated into the ON state, and the image processing unit 194 and the communication controller 195 return to the standby mode from the sleep mode.

The first imaging unit 192 takes the image of the detecting range F2 at predetermined time intervals during the activation thereof. After the image is taken by the first imaging unit 192, the approach determining process and the stay determining process are performed.

At a time t3, the person moves in the direction D1 approaching the image processing apparatus 10, as illustrated in FIG. 9C. Then, it is determined in the approach determining process that the person is approaching the image processing apparatus 10. In this case, the person approaching the image processing apparatus 10 is recognized as the user of the image processing apparatus 10. If it is determined in the approach determining process that the person is approaching the image processing apparatus 10, the major system returns to the standby mode from the sleep mode.

At a time t4, the user moves into the operation area F3, as illustrated in FIG. 9D. Then, it is determined in the stay determining process that the user is present in the operation area F3. The major system does not shift to the sleep mode during the time in which it is determined in the stay determining process that the user is present in the operation area F3.

During a period from the time t4 to a time t5, the face authentication process is performed on the user having moved to the position in front of the image processing apparatus 10, and then a process is performed in accordance with the operation of the authenticated user. In this process, the second imaging unit 193 takes the image of the face of the user. The face authentication process is performed on the basis of the image taken by the second imaging unit 193.

At the time t5, the user finishes using the image processing apparatus 10, and moves out of the operation area F3 with the back of the user facing the image processing apparatus 10, as illustrated in FIG. 9E. Then, it is determined in the stay determining process that the user is absent in the operation area F3. If it is determined in the stay determining process that the user is absent in the operation area F3, the first timer 111 is activated to start measuring a set time T1 (one minute, for example).

At a time t6, the user moves out of the detection area F1, as illustrated in FIG. 9F. Then, the human sensor 191 stops detecting the person, and thus the detection signal turns off. Upon turn-off of the detection signal, the second timer 112 is activated to start measuring a set time T2 (thirty seconds, for example).

At a time t7, the time measured by the second timer 112 reaches the set time T2, and then whether or not the operation mode of the major system is the sleep mode is determined. In this example, the operation mode of the major system is not the sleep mode. Therefore, no operation is performed upon lapse of the set time T2.

At a time t8, the time measured by the first timer 111 reaches the set time T1, and then the major system shifts to the sleep mode. Further, the first imaging unit 192 and the second imaging unit 193 shift to the OFF state, and the image processing unit 194 and the communication controller 195 shift to the sleep mode.

Figure 11A:
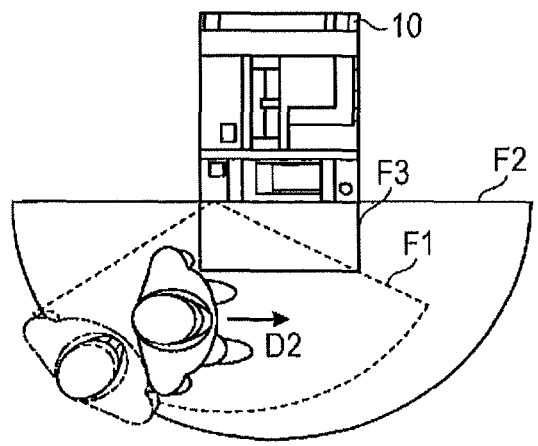
FIGS. 11A to 11C are diagrams illustrating the positional relationship between the image processing apparatus and a person.
Figure 11B:
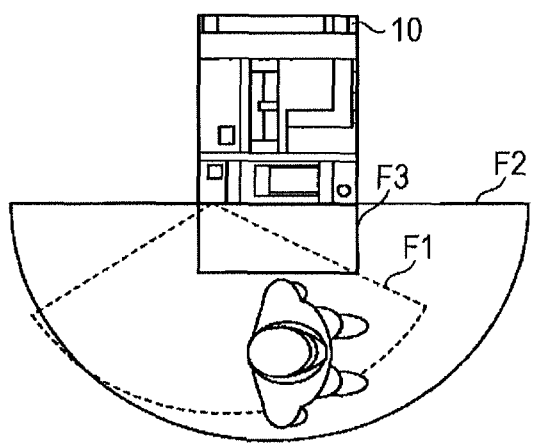
Figure 11C:
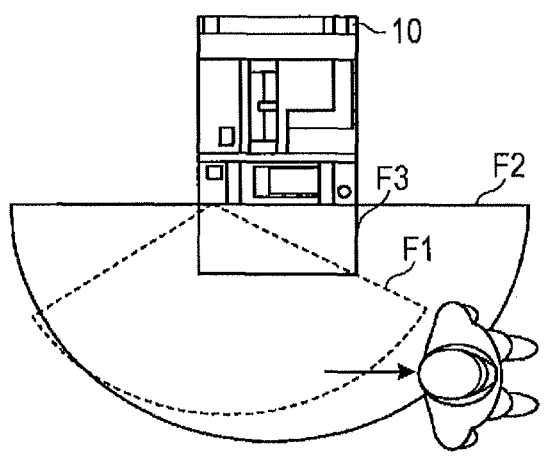

FIG. 10 is a timing chart illustrating another example of the first shifting operation. FIGS. 11A to 11C are diagrams illustrating the positional relationship between the image processing apparatus 10 and a person. With reference to FIG. 10 and FIGS. 11A to 11C, a description will now be given of an example of the operation performed when a person not using the image processing apparatus 10 passes across the detection area F1 in a state in which the operation mode of the major system of the image processing apparatus 10, the image processing unit 194, and the communication controller 195 has shifted to the sleep mode and the first imaging unit 192 and the second imaging unit 193 are in the OFF state.

Operations performed at times t11 and t12 are similar to the operations performed at the times t1 and t2 illustrated in FIG. 8. In this example, however, a person having moved into the detecting range F2 moves in the direction D2 different from the direction approaching the image processing apparatus 10, as illustrated in FIGS. 11A and 11B. In this case, the person in the detecting range F2 is not approaching the image processing apparatus 10. It is therefore determined in the approach determining process that no person is approaching the image processing apparatus 10. Further, there is no person in the operation area F3. It is therefore determined in the stay determining process that there is no person in the operation area F3.

At a time t13, the person moves out of the detection area F1, as illustrated in FIG. 11C. Then, the human sensor 191 stops detecting the person, and the detection signal turns off. Upon turn-off of the detection signal, the second timer 112 is activated to start measuring the set time T2.

At a time t14, the time measured by the second timer 112 reaches the set time T2, and then whether or not the operation mode of the major system is the sleep mode is determined. In this example, the major system has not returned to the standby mode, and the sleep mode is maintained. Therefore, the operation mode of the major system is determined as the sleep mode. In this case, the first imaging unit 192 and the second imaging unit 193 shift to the OFF state, and the image processing unit 194 and the communication controller 195 shift to the sleep mode.

With reference to the flowcharts of FIGS. 12 to 14, the first shifting operation will now be described in more detail. In the initial state, the major system of the image processing apparatus 10, the image processing unit 194, and the communication controller 195 have shifted to the sleep mode, and the first imaging unit 192 and the second imaging unit 193 are in the OFF state.

At step S101, if a person moves into the detection area F1, as illustrated in FIG. 9B, the human sensor 191 detects the person in the detection area F1 (YES at step S101), and the detection signal of the human sensor 191 turns on at step S102. Further, upon turn-on of the detection signal of the human sensor 191, the operation mode controller 101 resets the second timer 112. If the detection signal of the human sensor 191 turns off, the operation mode controller 101 again activates the second timer 112 to start measuring the set time T2.

At step S103, the first imaging unit 192 and the second imaging unit 193 are activated, and the communication controller 195 and the image processing unit 194 return to the standby mode from the sleep mode. Specifically, the operation mode controller 101 issues an instruction to shift the operation mode of the first imaging unit 192 and the second imaging unit 193 to the ON state from the OFF state. In accordance with the instruction, the power controller 102 supplies power to the first imaging unit 192 and the second imaging unit 193 to activate the first imaging unit 192 and the second imaging unit 193 into the ON state. Further, the operation mode controller 101 issues an instruction to shift the operation mode of the image processing unit 194 and the communication controller 195 to the standby mode from the sleep mode. In accordance with the instruction, the power controller 102 supplies the image processing unit 194 and the communication controller 195 with power necessary for the operation thereof to bring the image processing unit 194 and the communication controller 195 into the operating state. Thereby, the image processing unit 194 and the communication controller 195 return to the standby mode from the sleep mode.

At step S104, the first imaging unit 192 starts taking images of the detecting range F2. Thereafter, the first imaging unit 192 takes the image of the detecting range F2 at predetermined time intervals during the activation thereof. The approach determining unit 103 starts the approach determining process on the basis of the image taken by the first imaging unit 192. The stay determining unit 104 starts the stay determining process on the basis of the image taken by the first imaging unit 192.

At step S105, if the approach determining unit 103 does not detect a human shape from the image taken by the first imaging unit 192 in the approach determining process (NO at step S105), the approach determining unit 103 again performs the human shape detection on the basis of the image newly taken by the first imaging unit 192. Meanwhile, if a human shape is detected from the image taken by the first imaging unit 192 (YES at step S105), the operation proceeds to step S106.

At step S106, if the person in the detecting range F2 moves in the direction D1 approaching the image processing apparatus 10, as illustrated in FIG. 9C, the approach determining unit 103 determines in the approach determining process that the person in the detecting range F2 is approaching the image processing apparatus 10 (YES at step S106). In this case, the operation proceeds to step S107. Further, the person approaching the image processing apparatus 10 is recognized as the user.

At step S107, the major system returns to the standby mode from the sleep mode. Specifically, the communication controller 195 transmits to the operation mode controller 101 the information for instructing the major system to return from the sleep mode. Upon receipt of the information, the operation mode controller 101 issues an instruction to shift the operation mode of the major system to the standby mode from the sleep mode. In accordance with the instruction, the power controller 102 supplies the major system with power necessary for the operation thereof to bring the major system into the operating state. Thereby, the major system returns to the standby mode from the sleep mode.

Figure 13:
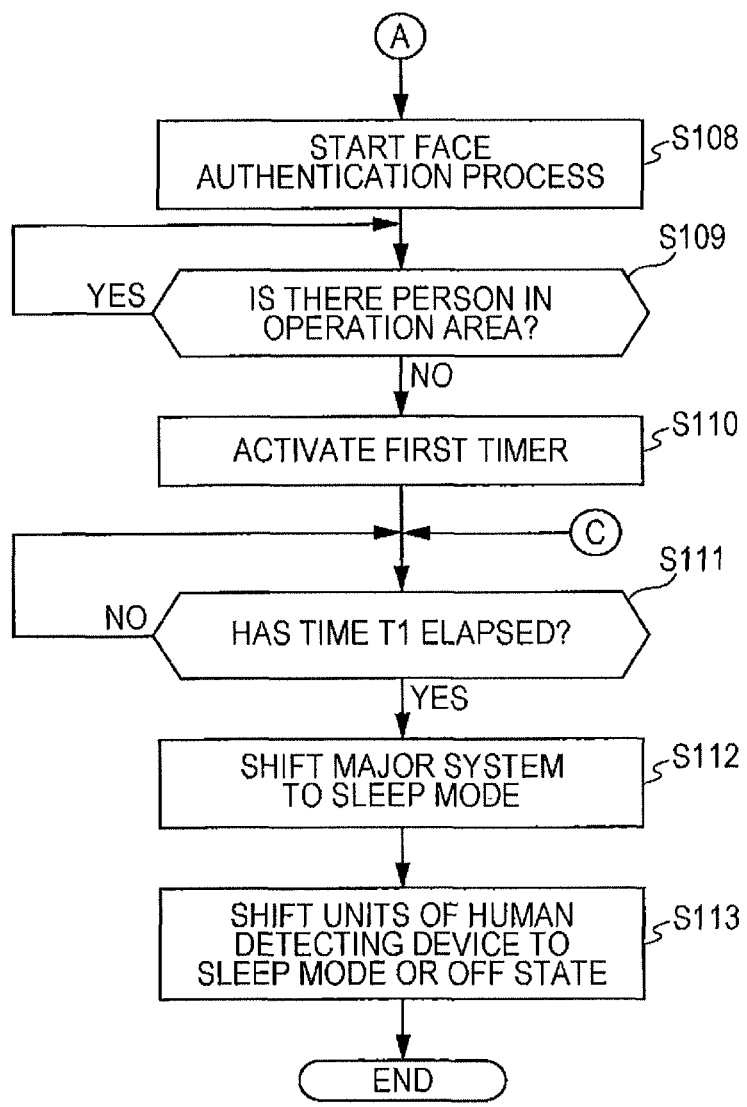
FIG. 13 is a flowchart illustrating the first shifting operation.
Figure 14:
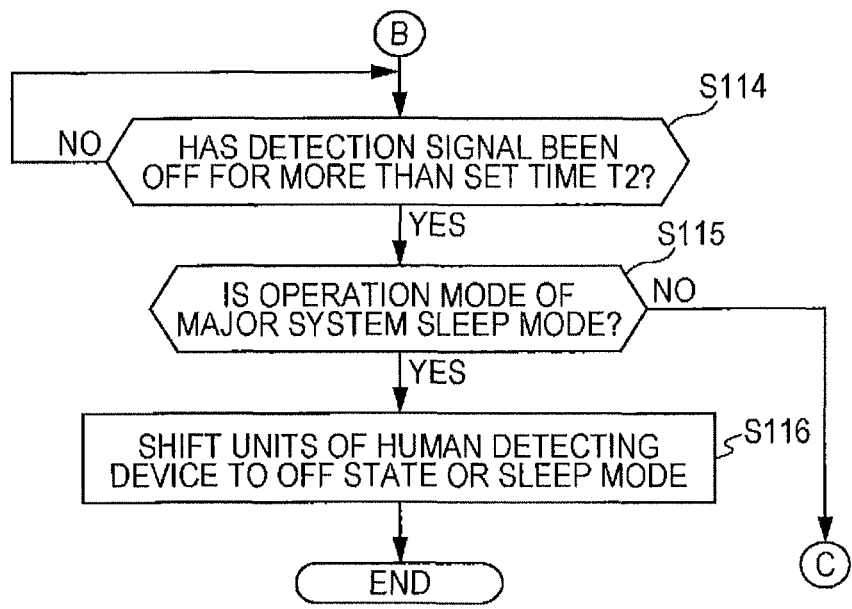
FIG. 14 is a flowchart illustrating the first shifting operation.
Figure 15:
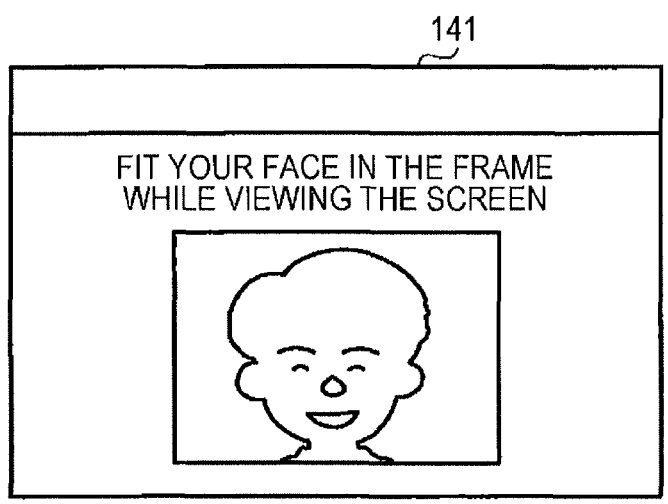
FIG. 15 is a diagram illustrating an example of a face authentication screen.

At step S108 illustrated in FIG. 13, the authentication unit 105 starts the face authentication process after the major system returns to the standby mode from the sleep mode. Specifically, a face authentication screen 141 is first displayed on the display 14. FIG. 15 illustrates an example of the face authentication screen 141. The second imaging unit 193 takes the image of the face of the user. The face authentication screen 141 displays the image taken by the second imaging unit 193. The authentication unit 105 performs the face authentication process on the basis of the image taken by the second imaging unit 193. If the face image taken by the second imaging unit 193 does not match the previously registered face image of the valid user, the user authentication fails. In this case, the use of the image processing apparatus 10 by the user is prohibited. Meanwhile, if the face image taken by the second imaging unit 193 matches the previously registered face image of the valid user, the user authentication succeeds. In this case, the user operates and causes the image processing apparatus 10 to perform a desired process.

At step S109, if the user is present in the operation area F3, as illustrated in FIG. 9D, the stay determining unit 104 determines in the stay determining process that the user is present in the operation area F3 (YES at step S109). In this case, the stay determining unit 104 again performs the stay determining process on the basis of the image newly taken by the first imaging unit 192. Meanwhile, if the user finishes using the image processing apparatus 10, the user moves out of the operation area F3, as illustrated in FIG. 9E. Thereby, it is determined that the user is absent in the operation area F3 (NO at step S109), and the operation proceeds to step S110.

At step S110, the major system satisfies the condition for shifting to the sleep mode, and thus the operation mode controller 101 activates the first timer 111 to start measuring the set time T1.

At step S111, the operation mode controller 101 stands by until the time measured by the first timer 111 exceeds the set time T1 (NO at step S111). If the time measured by the first timer 111 exceeds the set time T1 (YES at step S111), the operation proceeds to step S112.

At Step S112, the major system shifts to the sleep mode. Specifically, the operation mode controller 101 issues an instruction to shift the operation mode of the major system to the sleep mode from the standby mode. In accordance with the instruction, the power controller 102 stops supplying power to at least a part of the major system to bring at least the part of the major system into the non-operating state. Thereby, the major system shifts to the sleep mode.

At step S113, the first imaging unit 192 and the second imaging unit 193 shift to the OFF state, and the image processing unit 194 and the communication controller 195 shift to the sleep mode. Specifically, the operation mode controller 101 issues an instruction to shift the operation mode of the first imaging unit 192 and the second imaging unit 193 to the OFF state from the ON state. In accordance with the instruction, the power controller 102 stops supplying power to the first imaging unit 192 and the second imaging unit 193 to bring the first imaging unit 192 and the second imaging unit 193 into the OFF state. Further, the operation mode controller 101 issues an instruction to shift the operation mode of the image processing unit 194 and the communication controller 195 to the sleep mode from the standby mode. In accordance with the instruction, the power controller 102 stops supplying power to at least parts of the image processing unit 194 and the communication controller 195 to bring at least the parts of the image processing unit 194 and the communication controller 195 into the non-operating state. Thereby, the image processing unit 194 and the communication controller 195 shift to the sleep mode.

Meanwhile, if the person in the detecting range F2 is moving in the direction D2 different from the direction approaching the image processing apparatus 10, as illustrated in FIG. 11A, it is determined at step S106 described above that the person in the detecting range F2 is not approaching the image processing apparatus 10 (NO at step S106). In this case, the operation proceeds to step S114 illustrated in FIG. 14.

At step S114, the operation mode controller 101 determines whether or not the detection signal of the human sensor 191 has been in the OFF state for more than the set time T2. When the detection signal of the human sensor 191 turns off, the operation mode controller 101 activates the second timer 112 to start measuring the set time T2. If a person is moving in the detection area F1, as illustrated in FIG. 11B, the detection signal of the human sensor 191 turns on every time the person moves. In this case, therefore, it is determined that the detection signal of the human sensor 191 has not been in the OFF state for more than the set time T2 (NO at step S114). Meanwhile, if the person moves out of the detection area F1, as illustrated in FIG. 11C, the detection signal of the human sensor 191 turns off, and thereafter the time measured by the second timer 112 exceeds the set time T2. At this, therefore, it is determined that the detection signal of the human sensor 191 has been in the OFF state for more than the set time T2 (YES at step S114). In this case, the operation proceeds to step S115.

At step S115, the operation mode controller 101 determines whether or not the operation mode of the major system is the sleep mode. If the operation mode of the major system is not the sleep mode (NO at step S115), the operation proceeds to step S111 described above. Meanwhile, if the operation mode of the major system is the sleep mode (YES at step S115), the operation proceeds to step S116.

At step S116, the first imaging unit 192 and the second imaging unit 193 shift to the OFF state, and the image processing unit 194 and the communication controller 195 shift to the sleep mode. Specifically, the operation mode controller 101 issues an instruction to shift the operation mode of the first imaging unit 192 and the second imaging unit 193 to the OFF state from the ON state. In accordance with the instruction, the power controller 102 stops supplying power to the first imaging unit 192 and the second imaging unit 193 to bring the first imaging unit 192 and the second imaging unit 193 into the OFF state. Further, the operation mode controller 101 issues an instruction to shift the operation mode of the image processing unit 194 and the communication controller 195 to the sleep mode from the standby mode. In accordance with the instruction, the power controller 102 stops supplying power to at least parts of the image processing unit 194 and the communication controller 195 to bring at least the parts of the image processing unit 194 and the communication controller 195 into the non-operating state. Thereby, the image processing unit 194 and the communication controller 195 shift to the sleep mode.

(2) Second Shifting Operation

Figure 16:
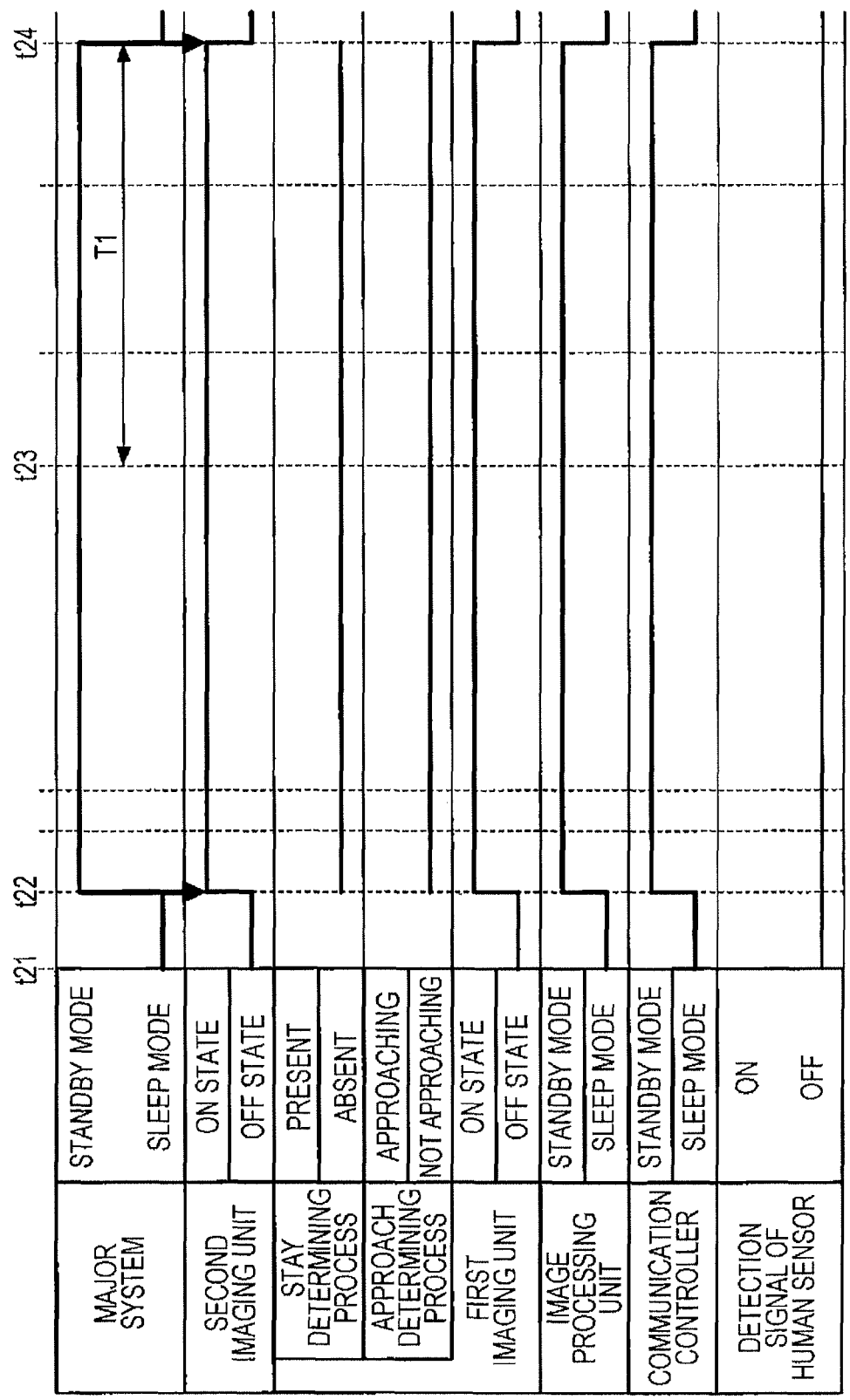
FIG. 16 is a timing chart illustrating an example of a second shifting operation.

FIG. 16 is a timing chart illustrating an example of the second shifting operation. With reference to FIG. 16, a description will now be given of an example of the operation performed when the user transmits a print request to the image processing apparatus 10 by operating the client apparatus 20 in a state in which the operation mode of the major system of the image processing apparatus 10, the image processing unit 194, and the communication controller 195 has shifted to the sleep mode and the first imaging unit 192 and the second imaging unit 193 are in the OFF state. The print request includes image data.

At a time t21, there is no person in the detection area F1, as illustrated in FIG. 9A. Therefore, the human sensor 191 does not detect a person, and the detection signal is off.

At a time t22, the major system returns to the standby mode from the sleep mode upon receipt of the print request from the client apparatus 20 via the communication unit 12. Upon return of the major system to the standby mode from the sleep mode, the first imaging unit 192 and the second imaging unit 193 are activated into the ON state, and the image processing unit 194 and the communication controller 195 return to the standby mode from the sleep mode.

During a period from the time t22 to a time t23, the image processing apparatus 10 performs the printing process in accordance with the print request received from the client apparatus 20. At the time t23, the printing process is completed, and the first timer 111 is activated to start measuring the set time T1.

At a time t24, the time measured by the first timer 111 reaches the set time T1, and then the major system shifts to the sleep mode. Upon shift of the major system to the sleep mode, the first imaging unit 192 and the second imaging unit 193 shift to the OFF state, and the image processing unit 194 and the communication controller 195 shift to the sleep mode.

Figure 17:
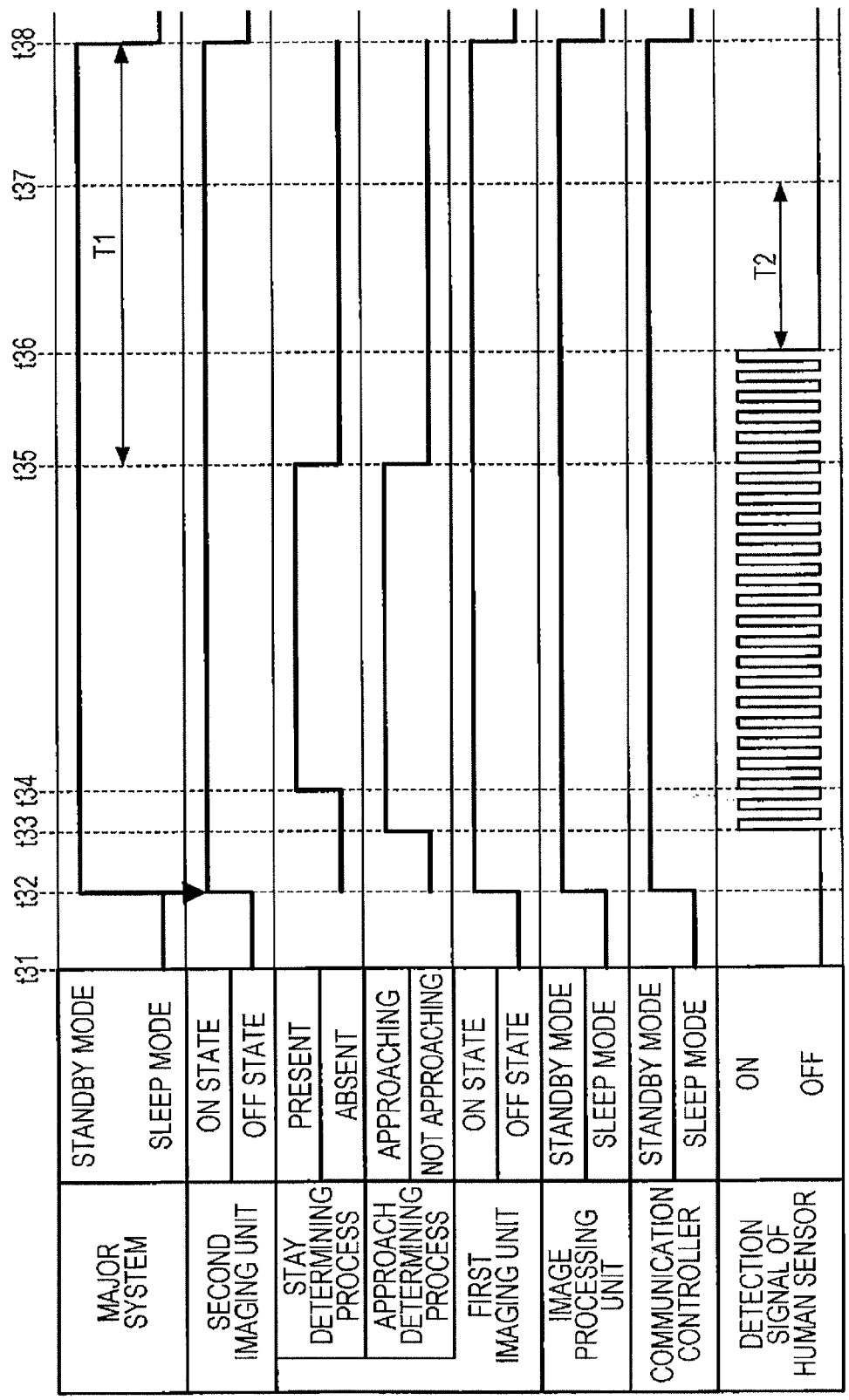
FIG. 17 is a timing chart illustrating another example of the second shifting operation.

FIG. 17 is a timing chart illustrating another example of the second shifting operation. With reference to FIG. 17, a description will now be given of an example of the operation performed when the user approaches the image processing apparatus 10 to use the image processing apparatus 10 in a state in which the major system has shifted to the standby mode in the example illustrated in FIG. 16.

Operations performed at times t31 and t32 are similar to the operations performed at the times t21 and t22 illustrated in FIG. 16. In this example, the printing process starts at the time t32.

At a time t33, a person moves into the detection area F1, as illustrated in FIG. 9B. Then, the human sensor 191 detects the person, and the detection signal turns on, similarly to the operation performed at the time t2 illustrated in FIG. 8.

At a time t34, the person moves in the direction D1 approaching the image processing apparatus 10, as illustrated in FIG. 9C. Then, it is determined in the approach determining process that the person is approaching the image processing apparatus 10. At this time, the major system has already returned from the sleep mode, and thus the shift of the operation mode of the major system does not take place.

During a period from the time t34 to a time t35, the face authentication process is performed on the user having moved to the position in front of the image processing apparatus 10, and then a process is performed in accordance with the operation of the authenticated user. Operations performed during a period from the time t35 to a time t38 are similar to the operations performed during the period from the time t5 to the time t8 illustrated in FIG. 8.

According to the exemplary embodiment described above, the major system, the first imaging unit 192, the second imaging unit 193, the image processing unit 194, and the communication controller 195 have shifted to the sleep mode or the OFF state during the absence of the user. Therefore, the power consumption is reduced as compared with a case in which these configurations are kept in the standby mode or in the ON state during the absence of the user. Further, the major system and the second imaging unit 193 shift to the standby mode or the ON state before the user reaches the image processing apparatus 10. Therefore, the user authentication and the use of the image processing apparatus 10 start immediately after the user reaches the image processing apparatus 10. Accordingly, the power consumption during the absence of the user is reduced, and the use of the image processing apparatus 10 starts when the user reaches the image processing apparatus 10.

In some cases, it takes a certain time (200 milliseconds to 500 milliseconds) to activate the first imaging unit 192 and the second imaging unit 193. According to the above-described exemplary embodiment, the first imaging unit 192 and the second imaging unit 193 are activated when the user moves into the detection area F1. Even if it takes a certain time to activate the first imaging unit 192 and the second imaging unit 193, therefore, the use of the image processing apparatus 10 starts immediately after the user reaches the image processing apparatus 10.

Further, according to the above-described exemplary embodiment, the major system returns to the standby mode from the sleep mode only if it is determined that a person in the detecting range F2 is approaching the image processing apparatus 10 on the basis of the image taken by the first imaging unit 192. If a person not using the image processing apparatus 10 simply passes nearby the image processing apparatus 10, therefore, the major system is prevented from returning to the standby mode from the sleep mode.

Further, according to the above-described exemplary embodiment, the user authentication is performed on the basis of the image of the face of the user taken by the second imaging unit 193. Therefore, highly accurate user authentication is realized without trouble.

3. Modification Examples

The above-described exemplary embodiment is an example of the present invention. The exemplary embodiment may be modified as follows. Further, the following modification examples may be implemented in combination with one another.

(1) In the above-described exemplary embodiment, the description has been given of the example in which the first imaging unit 192 and the second imaging unit 193 are activated when the human sensor 191 detects a person in the detection area F1. The time of activating the second imaging unit 193, however, is not limited to the example described in the exemplary embodiment. For example, the second imaging unit 193 may be activated when a predetermined time elapses after the activation of the first imaging unit 192 upon detection of a person in the detection area F1 by the human sensor 191. Preferably, however, the second imaging unit 193 is activated before the major system returns to the standby mode from the sleep mode.

(2) In the above-described examples illustrated in FIGS. 8 and 17, the description has been given of the example in which the major system, the image processing unit 194, and the communication controller 195 shift to the sleep mode and the first imaging unit 192 and the second imaging unit 193 shift to the OFF state when the set time T1 elapses after the user moves out of the operation area F3. However, the time of shifting the major system, the image processing unit 194, and the communication controller 195 to the sleep mode and the time of shifting the first imaging unit 192 and the second imaging unit 193 to the OFF state are not limited to this example. For example, the major system, the image processing unit 194, and the communication controller 195 may shift to the sleep mode and the first imaging unit 192 and the second imaging unit 193 may shift to the OFF state when the user moves out of the operation area F3. In this case, there is no need to provide the first timer 111.

Similarly, in the example illustrated in FIG. 10, the description has been given of the example in which the image processing unit 194 and the communication controller 195 shift to the sleep mode and the first imaging unit 192 and the second imaging unit 193 shift to the OFF state when the set time T2 elapses after the turn-off of the detection signal of the human sensor 191. However, the time of shifting the image processing unit 194 and the communication controller 195 to the sleep mode and the time of shifting the first imaging unit 192 and the second imaging unit 193 to the OFF state are not limited to this example. For example, the image processing unit 194 and the communication controller 195 may shift to the sleep mode and the first imaging unit 192 and the second imaging unit 193 may shift to the OFF state when the detection signal of the human sensor 191 turns off. In this case, there is no need to provide the second timer 112.

(3) In the above-described exemplary embodiment, the description has been given of the example in which whether or not a person in the detecting range F2 is approaching the image processing apparatus 10 is determined in the approach determining process on the basis of the direction of the human body. In this example, the direction of the human body may be determined on the basis of, for example, whether or not a human face is detected from the area of the human shape included in the image taken by the first imaging unit 192.

(4) In the above-described exemplary embodiment, the description has been given of the example in which the non-operating state of the first imaging unit 192 and the second imaging unit 193 corresponds to the OFF state. The non-operating state of the first imaging unit 192 and the second imaging unit 193, however, is not limited to the OFF state. For example, the non-operating state of the first imaging unit 192 and the second imaging unit 193 may correspond to the sleep mode, or may correspond to an operation mode other than the sleep mode, in which the power consumption is reduced as compared with the operating state.

In the above-described exemplary embodiment, the description has been given of the example in which the non-operating state of the major system, the image processing unit 194, and the communication controller 195 corresponds to the sleep mode. The non-operating state of the major system, the image processing unit 194, and the communication controller 195, however, is not limited to the sleep mode. For example, the non-operating state of the major system, the image processing unit 194, and the communication controller 195 may correspond to the OFF state, or may correspond to an operation mode other than the sleep mode, in which the power consumption is reduced as compared with the operating state.

(5) The size and shape of the detection area F1, the detecting range F2, and the operation area F3 are not limited to the examples described in the exemplary embodiment. For example, the radius of the detecting range F2 may be greater than 1000 mm, for example. Further, the length in the y-axis direction of the operation area F3 may be greater than 300 mm, for example. Further, the shape of the operation area F3 may be semicircular.

(6) The functions distributed to the controller 11 and the image processing unit 194 are not limited to the examples described in the exemplary embodiment. For example, a part of the operation mode controller 101, such as a part controlling the operation mode of the human detecting device 19, for example, may be realized by the image processing unit 194. Further, the power controller 102 may be realized by a hardware configuration other than the controller 11.

(7) In the above-described exemplary embodiment, the face authentication screen 141 displays the image taken by the second imaging unit 193. However, the face authentication screen 141 may not necessarily display the image. For example, if an instruction not to display the image is input by the operation of the user, the face authentication screen 141 may not display the image taken by the second imaging unit 193.

(8) In the above-described exemplary embodiment, the image processing apparatus 10 performs the scanning process, the copying process, the printing process, and the facsimile transmission process. However, not all of these processes may be performed by the image processing apparatus 10. For example, the image processing apparatus 10 may only perform the printing process or the facsimile transmission process.

Further, the power controlling device according to the exemplary embodiment of the present invention may be applied to an apparatus other than the image processing apparatus 10. In this case, the apparatus includes a processing unit that performs a process with power supplied thereto. The processing unit may perform a process other than the scanning process, the copying process, the printing process, and the facsimile transmission process.

(9) In the above-described exemplary embodiment, the program executed by the CPU of the controller 11 may be downloaded via a communication line, such as the Internet. Further, the program may be provided as recorded in a computer readable recording medium, such as a magnetic recording medium (a magnetic tape, a magnetic disc, or the like), an optical recording medium (an optical disc or the like), a magneto-optical recording medium, or a semiconductor memory. The same applies to the CPU of the image processing unit 194.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program that, when executed, causes a computer to execute a process for controlling power of an image processing apparatus, the process comprising:
    detecting, by a first detecting unit comprising a first sensor, a person present in a detection area;
    detecting, using a first imaging unit comprising a first camera, that the person in the detection area is approaching toward the computer;
    taking, by a second imaging unit comprising a second camera, an image of a face of the person present in a detecting range, wherein the first imaging unit, the second imaging unit and the first detecting unit are all separate from each other;
    controlling, by an operation mode controller, a mode of a powering controlling device, wherein the mode include at least a first mode and a sleep mode, and wherein power consumption of the first mode is higher than that of the sleep mode of the power controlling device;
    when the person is detected by the first detecting unit, but prior to the second imaging unit taking the image of the face of the person present in the detecting range and the first imaging unit detecting that the person is approaching toward the computer, switching, by a power controller, the first imaging unit and the second imaging unit from non-active mode into active mode while the mode of the powering controlling device is in the sleep mode;
    when the approaching of the person is detected by the first imaging unit after the first imaging unit is switched from the non-active mode into the active mode, switching, by the power controller, the mode of the powering controlling device from the sleep mode into the first mode; and
    authenticating, by an authenticating unit executed by a processor, the person based on a face image which is captured by the second imaging unit after the second imaging unit is switched from the non-active mode into the active mode and only after the powering controlling device is switched from the sleep mode into the first mode.

2. The non-transitory computer readable medium according to claim 1, wherein the process further comprising:
    when the person is absent in a predetermined area in an operating state of a central processing unit (CPU) of the image processing apparatus, stop supplying power to at least a part of the first imaging unit and a part of the second imaging unit to thereby bring at least the part of the first imaging unit and the part of the second imaging unit into a non-operating state.

3. The non-transitory computer readable medium according to claim 2, wherein the process further comprising: when the person is absent in the predetermined area in the operating state of a central processing unit (CPU) of the image processing apparatus, stop supplying power to at least a part of the CPU to thereby bring at least the part of the CPU into a non-operating state.

4. The non-transitory computer readable medium according to claim 1, wherein the process further comprising: determining whether or not the person is present in the predetermined area on a basis of the image taken by the first imaging unit.

5. An image processing apparatus comprising:
    the non-transitory computer readable medium according to claim 1; and
    a central processing unit (CPU) that performs, in an operating state, a process of reading an image of a document and generating image data, a process of forming an image on a basis of input image data, or a process of transmitting input image data to another image processing apparatus.

6. The non-transitory computer readable medium according to claim 1, wherein the second imaging unit is placed into the active mode as soon as any person is detected because activation of the second imaging unit needs a predetermined amount time to be fully activated.

7. The non-transitory computer readable medium according to claim 1, wherein the second imaging unit is placed into the active mode before the image processing apparatus but the person can use the image processing apparatus immediately after the user reaches the image processing apparatus whether or not the second imaging unit is fully activated.

8. A power controlling device comprising:
a first detecting unit comprising a first sensor that detects a person present in a detection area;
a first imaging unit comprising a first camera that detects that the person in the detection area is approaching toward the power controlling device;
a second imaging unit comprising a second camera that takes an image of a face of the person that is approaching toward the power controlling device for use in user authentication in an operating state, wherein the first imaging unit, the second imaging unit and the first detecting unit are all separate from each other;
an operation mode controller that controls a mode of the power controlling device, wherein the mode include at least a first mode and a sleep mode, and wherein power consumption of the first mode is higher than that of the sleep mode;
a power controller that:
when the first detecting unit detects the person, but prior to the second imaging unit takes the image of the face of the person present in a detecting range and the first imaging unit detects that the person is approaching toward the power controlling device, switches the second imaging unit and the first imaging unit from non-active mode into active mode while the mode of the powering controlling device is in the sleep mode, and
when the first imaging unit detects the approaching of the person after the first imaging unit is switched from the non-active mode into the active mode, switches the mode of the power controlling device from the sleep mode into the first mode; and
an authentication unit executed by a processor that authenticates the person based on a face image which is captured by the second imaging unit after the second imaging unit is switched from the non-active mode into the active mode and only after the power controlling device is switched from the sleep mode into the first mode.

9. The power controlling device according to claim 8, wherein, when the person is absent in a predetermined area in an operating state of a central processing unit (CPU) of an image forming apparatus, the power controller stops supplying power to at least a part of the first imaging unit and a part of the second imaging unit to thereby bring at least the part of the first imaging unit and the part of the second imaging unit into a non-operating state.

10. The power controlling device according to claim 9, wherein, when the person is absent in the predetermined area in the operating state of the CPU, the power controller stops supplying power to at least a part of the CPU to thereby bring at least the part of the CPU into a non-operating state.

11. The power controlling device according to claim 9, further comprising:
a determining unit that is executed by a processor and determines whether or not the person is present in the predetermined area on a basis of the image taken by the first imaging unit.

12. An image processing apparatus comprising:
the power controlling device according to claim 8; and
a central processing unit (CPU) that performs, in the operating state, a process of reading an image of a document and generating image data, a process of forming an image on a basis of input image data, or a process of transmitting input image data to another image processing apparatus.

13. The non-transitory computer readable medium according to claim 1, wherein the first detecting unit has a first area that is narrower than a second area of the first imaging unit.

14. The non-transitory computer readable medium according to claim 1, wherein:
the first detecting unit first detects a person at a first time,
the first imaging unit and the second imaging unit are both powered at the first time,
the first imaging unit detects a person approaching toward the computer at a second time which is after the first time, and
the powering controlling device is in the sleep mode from the first time until the second time.

* * * * *